US 12,420,341 B2

(12) United States Patent
Haylock

(10) Patent No.: US 12,420,341 B2
(45) Date of Patent: Sep. 23, 2025

(54) BLIND FASTENER

(71) Applicant: Howmet Aerospace Inc., Pittsburgh, PA (US)

(72) Inventor: Luke L. Haylock, Culver City, CA (US)

(73) Assignee: Howmet Aerospace Inc., Pittsburgh, PA (US)

( * ) Notice: Subject to any disclaimer, the term of this patent is extended or adjusted under 35 U.S.C. 154(b) by 0 days.

(21) Appl. No.: 17/542,036

(22) Filed: Dec. 3, 2021

(65) Prior Publication Data
US 2023/0173589 A1 Jun. 8, 2023

(51) Int. Cl.
*B23B 35/00* (2006.01)
*B23B 27/14* (2006.01)
*B23B 51/08* (2006.01)
*B23B 51/10* (2006.01)
*F16B 19/10* (2006.01)

(52) U.S. Cl.
CPC .............. *B23B 35/00* (2013.01); *B23B 27/14* (2013.01); *B23B 51/08* (2013.01); *B23B 51/101* (2013.01); *B23B 51/102* (2013.01); *F16B 19/1072* (2013.01)

(58) Field of Classification Search
CPC ....... B23B 35/00; B23B 51/102; B23B 51/08; B23B 51/101
See application file for complete search history.

(56) References Cited

U.S. PATENT DOCUMENTS 2,365,648 A * 12/1944 Rossmann ............ B23B 51/102
408/93
2,657,597 A * 11/1953 Pickering .............. B23B 51/101
408/200
2,663,203 A * 12/1953 Fried ....................... B23B 51/08
408/72 R (Continued)

FOREIGN PATENT DOCUMENTS

CA           2003735 C         1/2000
DE         19712377 A1 *      11/1997  ........... B23B 51/101
(Continued)

OTHER PUBLICATIONS

KR20180052303A machine translation (Year: 2016).*
(Continued)

*Primary Examiner* — Michael W Hotchkiss
(74) *Attorney, Agent, or Firm* — Greenberg Traurig, LLP

(57) ABSTRACT

A method includes inserting a machining tool through a hole of at least one workpiece that includes a first surface and a second surface opposite the first surface and extends from the first surface to the second surface. The hole forms an inner wall. The machining tool includes a shaft and a cutting tip proximate to one end of the shaft. The cutting tip includes a cutting portion. The method includes positioning the cutting portion of the cutting tip to abut an edge of the hole. The edge is located at a junction of the second surface of the one of the at least one workpiece and the inner wall. The method includes forming a surface modification at the edge with the cutting tip. The method includes removing the machining tool from the hole. The method includes installing a fastener within the hole. The fastener engages the surface modification.

17 Claims, 6 Drawing Sheets

(56) References Cited

U.S. PATENT DOCUMENTS

| | | | | |
|---|---|---|---|---|
| 2,706,421 A * | 4/1955 | Fried | B23B 51/107 | 408/180 |
| 2,773,402 A * | 12/1956 | Edens | B23B 51/102 | 408/110 |
| 2,847,884 A * | 8/1958 | Favre | B23B 51/102 | 407/8 |
| 2,895,356 A * | 7/1959 | Cogsdill | B23B 51/101 | 408/200 |
| 2,959,999 A * | 11/1960 | Wing | F16B 19/1054 | 411/49 |
| 3,195,378 A * | 7/1965 | Cogsdill | B23B 51/102 | 82/1.2 |
| 3,940,214 A * | 2/1976 | Waschek | B23B 51/101 | 408/224 |
| 4,086,018 A * | 4/1978 | Robinson | B23B 51/101 | 408/226 |
| 4,589,310 A * | 5/1986 | Neumann | B23B 51/102 | 82/1.4 |
| 4,795,290 A * | 1/1989 | Lindberg | B23B 51/108 | 408/232 |
| 5,023,983 A | 6/1991 | Winkler et al. | | |
| 5,181,810 A * | 1/1993 | Heule | B23B 51/102 | 408/154 |
| 5,803,679 A * | 9/1998 | Heule | B23B 51/101 | 408/199 |
| 5,927,911 A * | 7/1999 | Steiner | B23Q 11/1023 | 408/187 |
| 6,036,409 A * | 3/2000 | Rissler | B23B 51/107 | 408/93 |
| 6,238,150 B1 * | 5/2001 | Yamada | B23B 51/101 | 408/154 |
| 6,270,296 B1 * | 8/2001 | Steiner | B23B 51/102 | 408/180 |
| 6,868,757 B2 | 3/2005 | Hufnagl et al. | | |
| 7,217,070 B2 * | 5/2007 | Hecht | B23B 51/101 | 407/113 |
| 7,261,498 B2 * | 8/2007 | Hecht | B23B 27/141 | 407/113 |
| 7,308,842 B2 | 12/2007 | Hufnagl et al. | | |
| 7,328,637 B2 * | 2/2008 | Takashima | B24B 39/02 | 408/124 |
| 7,364,389 B2 * | 4/2008 | Robinson | B23B 29/03414 | 408/180 |
| 7,445,410 B2 * | 11/2008 | Abramson | B23B 51/101 | 408/93 |
| 7,445,411 B2 * | 11/2008 | Tchorny | B23B 51/02 | 408/233 |
| 7,524,149 B2 * | 4/2009 | Heule | B23B 51/102 | 408/173 |
| 7,650,681 B2 * | 1/2010 | Jones | F16B 19/1054 | 29/524.1 |
| 7,824,141 B2 * | 11/2010 | Jones | B21J 15/043 | 411/501 |
| 8,292,553 B2 * | 10/2012 | Robinson | B23B 51/101 | 408/180 |
| 8,672,591 B2 * | 3/2014 | Heule | B23B 51/102 | 408/187 |
| 8,721,233 B2 * | 5/2014 | Burr | B23B 51/101 | 408/187 |
| 8,777,533 B2 | 7/2014 | Hufnagl et al. | | |
| 9,089,905 B1 * | 7/2015 | Craig | B23B 51/101 | |
| 9,120,163 B2 * | 9/2015 | Studer | B23B 51/102 | |
| 9,517,511 B1 * | 12/2016 | Sisco | B23Q 17/2233 | |
| 9,751,136 B2 * | 9/2017 | Mickelson | B23Q 15/20 | |
| 9,908,183 B2 * | 3/2018 | Faessler | B23B 51/101 | |
| 10,006,478 B2 | 6/2018 | Hufnagl et al. | | |
| 10,105,765 B2 * | 10/2018 | Studer | B23B 51/08 | |
| 11,097,360 B2 * | 8/2021 | Rebholz | B23B 51/08 | |
| 11,110,525 B2 * | 9/2021 | Albrecht | B23B 51/101 | |
| 11,517,968 B2 * | 12/2022 | Bae | B23B 29/03457 | |
| 2004/0208717 A1 * | 10/2004 | Greenhalgh | B23B 51/0018 | 408/224 |
| 2006/0291967 A1 * | 12/2006 | Heule | B23B 51/101 | 408/199 |
| 2007/0175015 A1 * | 8/2007 | Ainsworth | B23B 35/00 | 29/524.1 |
| 2008/0025804 A1 * | 1/2008 | Heule | B23B 51/101 | 407/42 |
| 2010/0183390 A1 * | 7/2010 | Heule | B23B 51/101 | 408/1 BD |
| 2011/0164937 A1 * | 7/2011 | Byrne | B23B 51/08 | 408/199 |
| 2015/0063933 A1 * | 3/2015 | Faessler | B23B 51/102 | 408/1 R |
| 2016/0311037 A1 * | 10/2016 | Studer | B23B 51/102 | |
| 2019/0176961 A1 * | 6/2019 | Tulloch | F16B 37/145 | |
| 2020/0001377 A1 * | 1/2020 | Huang | B23B 51/108 | |
| 2022/0153448 A1 * | 5/2022 | Smith | B64F 5/10 | |
| 2024/0293876 A1 * | 9/2024 | Studer | B23B 51/101 | |

FOREIGN PATENT DOCUMENTS

| | | | | |
|---|---|---|---|---|
| EP | 1075888 A1 * | 2/2001 | | B23B 51/101 |
| KR | 20180052303 A * | 11/2016 | | |
| WO | WO-2005037473 A1 * | 4/2005 | | B23B 51/102 |
| WO | WO-2014026208 A1 * | 2/2014 | | B23B 51/101 |

OTHER PUBLICATIONS

EP-1075888-A1 machine translation (Year: 2001).*
WO-2014026208-A1 translation (Year: 2014).*
DE-19712377-A1 translation (Year: 1997).*

* cited by examiner

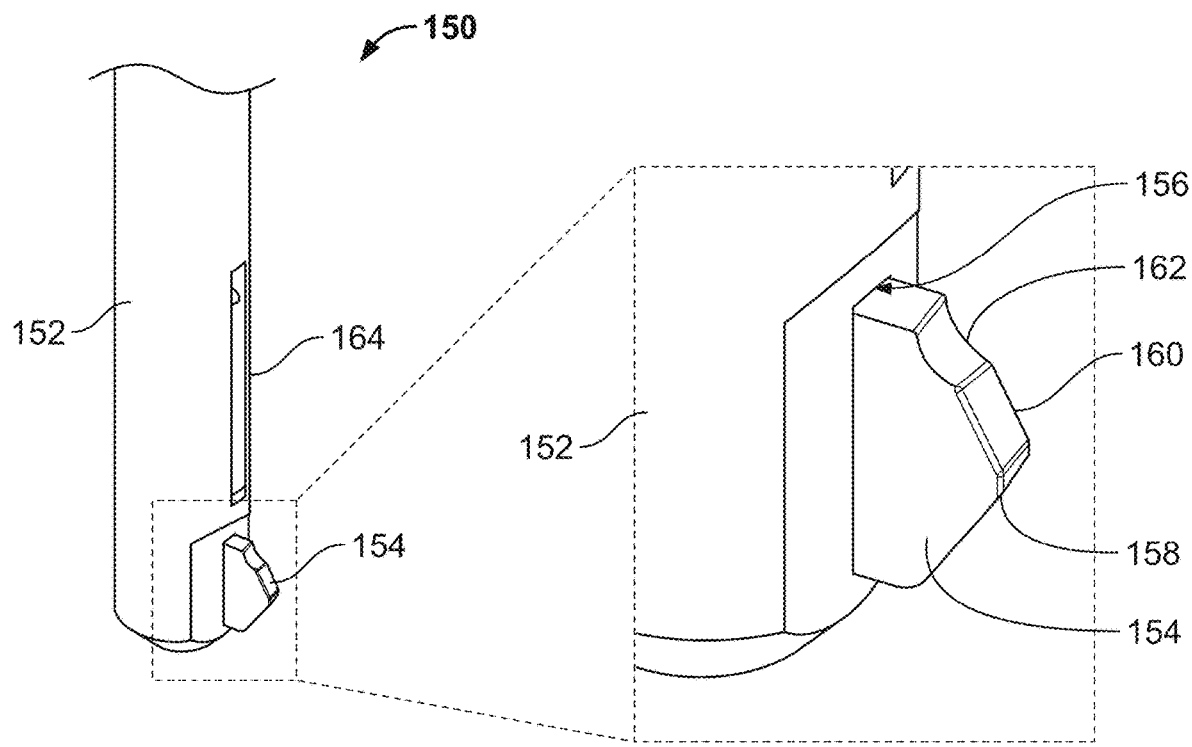
FIG. 5A
FIG. 5B
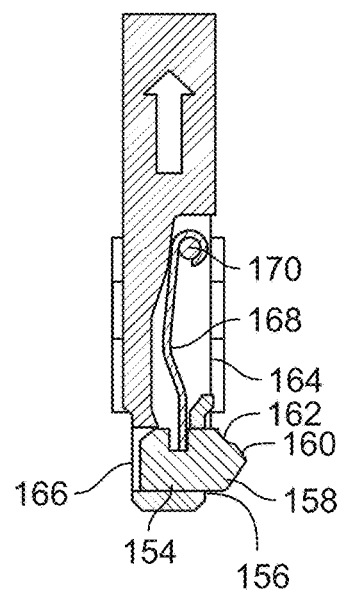
FIG. 5C

BLIND FASTENER

FIELD

This disclosure relates generally to fasteners. More particularly, this disclosure relates to fasteners such as blind fasteners for securing a plurality of workpieces together.

BACKGROUND

Blind fasteners are commonly used to secure a plurality of workpieces together when it is difficult or impossible to access a blind side of one of the workpieces. Blind fasteners generally include a deformable sleeve that, when deformed, engages a surface of the blind side of one of the workpieces to hold the workpieces together. Installation of fasteners tend to create high stress areas, particularly in composite structures.

SUMMARY

In some embodiments, a method includes inserting a machining tool through a hole of at least one workpiece. In some embodiments, the at least one workpiece includes a first surface and a second surface opposite the first surface. In some embodiments, the hole extends from the first surface to the second surface. In some embodiments, the hole forms an inner wall. In some embodiments, the machining tool includes a shaft, and a cutting tip located proximate to one end of the shaft. In some embodiments, the cutting tip includes a cutting portion. In some embodiments, the method includes positioning the cutting portion of the cutting tip to abut an edge of the hole of the one of the at least one workpiece. In some embodiments, the edge is located at a junction of the second surface of the one of the at least one workpiece and the inner wall. In some embodiments, the method includes forming a surface modification at the edge with the cutting tip. In some embodiments, the method includes removing the machining tool from the hole. In some embodiments, the method includes installing a fastener within the hole. In some embodiments, the fastener engages the surface modification.

In other embodiments of the method, the at least one workpiece may additionally and/or alternatively include a plurality of workpieces, the plurality of workpieces being configured to be joined to one another, and holes in the plurality of workpieces being substantially aligned with one another.

In other embodiments of the method, the method may additionally and/or alternatively include the step of forming the hole with the machining tool.

In other embodiments of the method, the step of forming the hole may additionally and/or alternatively include drilling.

In other embodiments of the method, the step of forming the hole and the step of inserting the machining tool into the hole may additionally and/or alternatively be performed concurrently.

In other embodiments of the method, the cutting tip may additionally and/or alternatively be moveable between a retracted position in which the cutting tip is substantially positioned within the shaft, and an extended position in which the cutting tip extends outwardly from the shaft.

In other embodiments of the method, the cutting tip may additionally and/or alternatively include a first ramped portion configured to contact the inner wall of the at least one workpiece to facilitate moving the cutting tip to its retracted position during the step of inserting the machining tool through the hole of the least one workpiece.

In other embodiments of the method, the cutting tip may additionally and/or alternatively be in its extended position during the steps of positioning the cutting portion of the cutting tip and forming a surface modification.

In other embodiments of the method, the cutting tip may additionally and/or alternatively include a second ramped portion configured to contact the inner wall to facilitate moving the cutting tip to its retracted position during the step of removing the machining tool from the hole.

In other embodiments of the method, the step of forming the surface modification may additionally and/or alternatively include rotating the machining tool.

In some embodiments, a machining tool includes a shaft; and a cutting tip located proximate to one end of the shaft. In some embodiments, the cutting tip includes a cutting portion. In some embodiments, the cutting tip includes a first ramped portion extending in a first direction relative to a longitudinal axis of the shaft. In some embodiments, the cutting tip includes a second ramped portion extending in a second direction relative to the longitudinal axis of the shaft.

In other embodiments of the machining tool, the first direction may additionally and/or alternatively be oblique relative to the longitudinal axis and the second direction is oblique relative to the longitudinal axis.

In other embodiments of the machining tool, the shaft may additionally and/or alternatively include a first opening, wherein the cutting portion is configured to be retractable into the shaft in a retracted position at the first opening and configured to be extendable from the shaft in an extended position at the first opening.

In other embodiments of the machining tool, the machining tool may additionally and/or alternatively include a spring member located within the shaft, wherein the spring member is attached to the cutting tip, and wherein the spring member is configured to facilitate movement of the cutting tip to and from its retracted position to its extended position.

In other embodiments of the machining tool, the machining tool may additionally and/or alternatively include a pin disposed within the shaft and extending transversely to the longitudinal axis of the shaft.

In other embodiments of the machining tool, the spring member may additionally and/or alternatively be rotatable about the pin between the extended position and the retracted position.

In other embodiments of the machining tool, the cutting portion may additionally and/or alternatively include a concave cutting surface.

In other embodiments of the machining tool, the cutting tip may additionally and/or alternatively be composed of carbide.

In other embodiments of the machining tool, the cutting tip may additionally and/or alternatively be coated with a diamond coating.

In other embodiments of the machining tool, the machining tool may additionally and/or alternatively include a drill bit located at the one end of the shaft.

BRIEF DESCRIPTION OF THE DRAWINGS

References are made to the accompanying drawings that form a part of this disclosure and that illustrate embodiments in which the systems and methods described in this Specification can be practiced.

FIGS. 5A through 5C illustrate a machining tool, according to some embodiments.

Like reference numbers represent the same or similar parts throughout.

DETAILED DESCRIPTION

Figure 1:
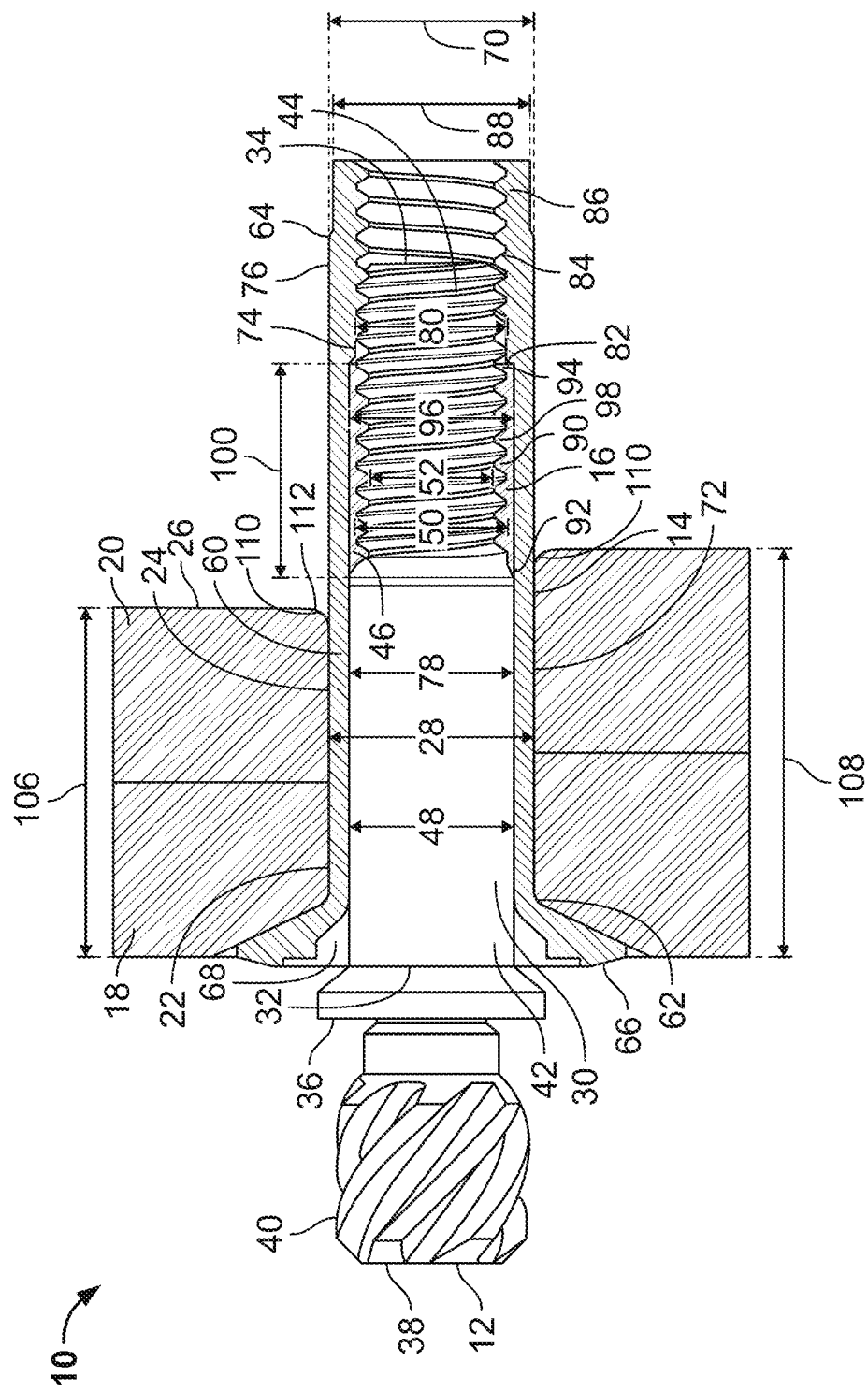
FIG. 1 illustrates a blind fastener shown in a pre-installed position, according to some embodiments.

Referring to FIGS. 1 through 4, in some embodiments, a fastener 10 is a "threaded type" fastener. In some embodiments, the fastener 10 includes a core bolt 12 (e.g., a pin member), a sleeve 14, and an insert 16. In some embodiments, the fastener 10 is configured to secure a plurality of workpieces 18, 20 to one another, and is configured to be installed within holes 22, 24 formed within the workpieces 18, 20. In some embodiments, the holes 22, 24 are substantially aligned with one another. In some embodiments, the holes 22, 24 are aligned with one another. In some embodiments, the workpiece 20 includes a blind side 26 that may be difficult or impossible to access by a user with a fastener installation tool or otherwise. In some embodiments, a portion of each of the holes 22, 24 has an inner diameter 28. In some embodiments, the hole 22 includes a countersunk portion.

In some embodiments, the workpiece 18 is composed of a composite material. In some embodiments, the workpiece 18 is substantially composed of a composite material. In some embodiments, the workpiece 18 is partially composed of a composite material. In some embodiments, the workpiece 18 is composed of a metallic material. In some embodiments, the workpiece 18 is substantially composed of a metallic material. In some embodiments, the workpiece 18 is partially composed of a metallic material. In some embodiments, the workpiece 18 is composed of aluminum.

In some embodiments, the workpiece 20 is composed of a composite material. In some embodiments, the workpiece 20 is substantially composed of a composite material. In some embodiments, the workpiece 20 is partially composed of a composite material. In some embodiments, the workpiece 20 is composed of a metallic material. In some embodiments, the workpiece 20 is substantially composed of a metallic material. In some embodiments, the workpiece 20 is partially composed of a metallic material. In some embodiments, the workpiece 20 is composed of aluminum.

In some embodiments, the core bolt 12 includes an elongated shank portion 30 extending along a longitudinal axis between a first end 32 and a second end 34 opposite the first end 32. In some embodiments, the core bolt 12 terminates with a head 36 at the first end 32. In an embodiment, the head 36 is an enlarged head. In some embodiments, the head 36 may include other shapes and sizes. In some embodiments, a fastener head 38, which is configured to be gripped by an installation tool, extends from the head 36 in a direction away from the elongated shank portion 30. In some embodiments, the fastener head 38 includes a plurality of splines 40 that are configured to be gripped by a correspondingly shaped fastener installation tool. In some embodiments, the elongated shank portion 30 includes a substantially smooth cylindrical portion 42 adjacent the first end 32, a threaded portion 44 adjacent the second end 34, and a thread run-out 46 (i.e., a step) intermediate the smooth cylindrical portion 42 and the threaded portion 44. In some embodiments, the smooth cylindrical portion 42 has an outer diameter 48. In some embodiments, the threaded portion 44 has a major diameter 50 that is less than the outer diameter 48 of the smooth cylindrical portion 42. In some embodiments, the threaded portion 44 includes a minor diameter 52.

Figure 2:
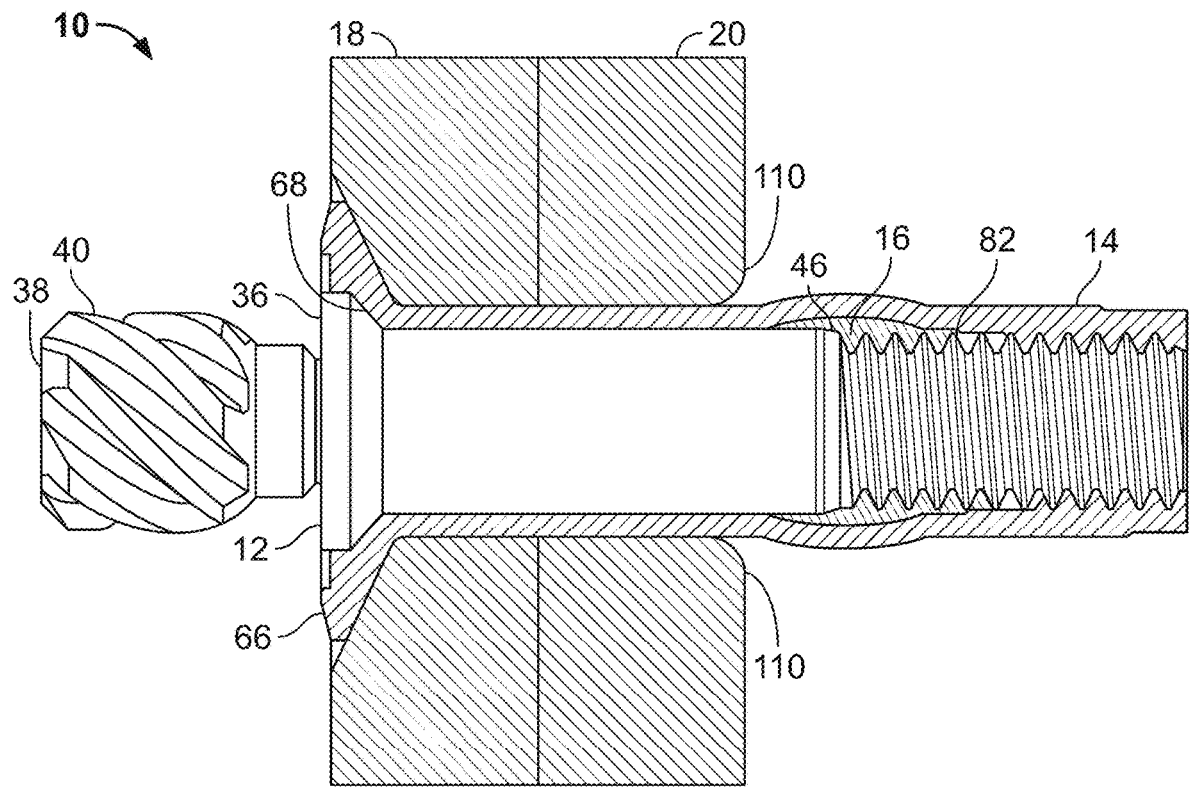
FIG. 2 illustrates the blind fastener of FIG. 1 shown in an intermediate position during installation, according to some embodiments.
Figure 3:
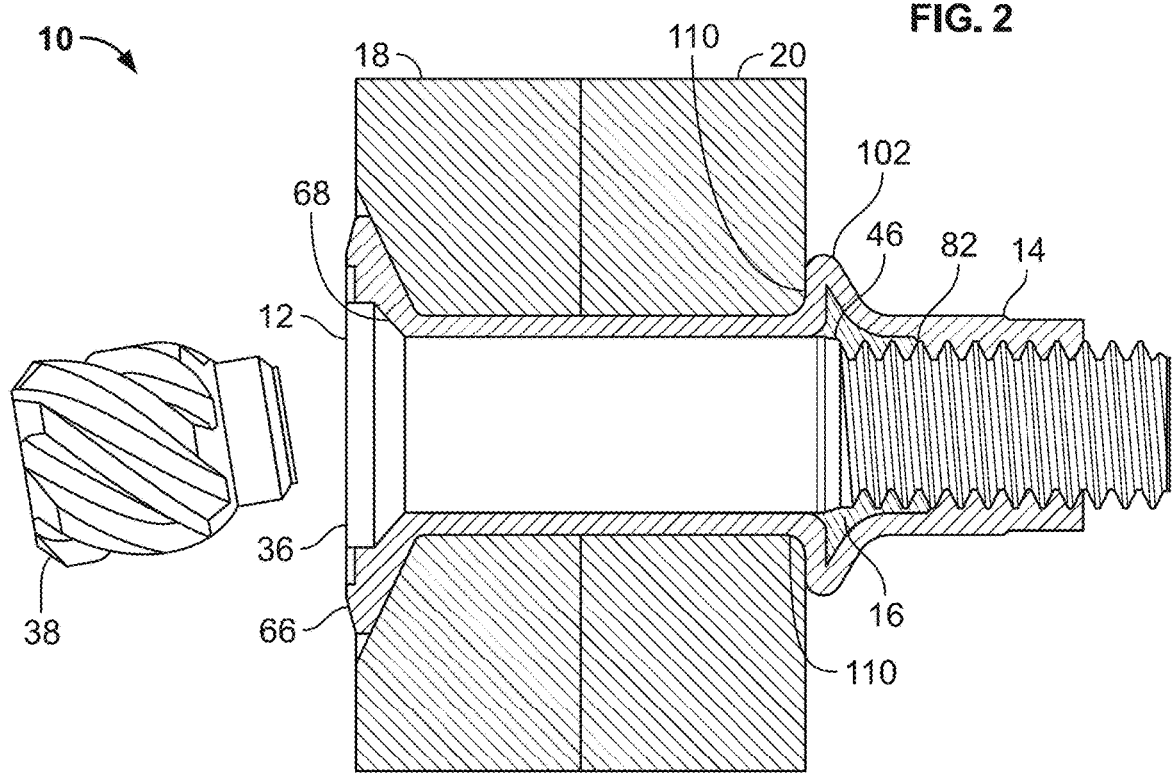
FIG. 3 illustrates the blind fastener of FIG. 1 shown in an installed position, according to some embodiments.

Still referring to FIGS. 1 through 3, in some embodiments, the sleeve 14 includes a tubular portion 60 having a first end 62 and a second end 64 opposite the first end 62. In some embodiments, the sleeve 14 terminates with a flanged head 66 at the first end 62. In some embodiments, a pocket 68 is formed within the flanged head 66. In some embodiments, the pocket 68 is sized and shaped to receive the head 36 of the core bolt 12. In some embodiments, the tubular portion 60 includes an outer diameter 70 that is sized and shaped to enable installation of the sleeve 14 within the holes 22, 24 of the workpieces 18, 20. In some embodiments, the tubular portion 60 includes a first region 72 adjacent the first end 62, a second region 74 intermediate the first end 62 and the second end 64, and a third region 76 adjacent the second end 64. In some embodiments, the first region 72 includes an inner diameter 78 that is sized and shaped to enable installation of the core bolt 12 within the sleeve 14. In some embodiments, the second region 74 includes an inner diameter 80 that is less than the inner diameter 78 of the first region 72 and greater than the major diameter 50 of the threaded portion 44 of the core bolt 12. In some embodiments, a step 82 is formed within the sleeve 14 and provides a stepped transition between the inner diameter 78 of the first region 72 and the inner diameter 80 of the second region 74. In some embodiments, the third region 76 includes internal threads 84 that are complementary to and configured to engage threadedly the threaded portion 44 of the core bolt 12. In some embodiments, the sleeve 14 includes a narrowed tip 86 adjacent the second end 64. In some embodiments, the narrowed tip 86 has an outer diameter 88 that is less than the outer diameter 70 of the tubular portion 60. In some embodiments, the sleeve 14 includes a band annealed portion positioned so as to be proximate the insert 16 when the fastener 10 is in a pre-installation position. In some embodiments, band annealing may be performed using a laser. In some embodiments, band annealing may be performed using a radio frequency induction coil. In some embodiments, band annealing may be performed using another suitable means known in the art.

In some embodiments, the insert 16 has a substantially tubular portion 90 extending from a first end 92 to a second end 94 opposite the first end 92. The tubular portion 90 has an outer diameter 96 that is sized and shaped to enable the installation of the insert 16 within the sleeve 14. In some embodiments, the outer diameter 96 of the insert 16 is substantially equal to the outer diameter 48 of the smooth cylindrical portion 42 of the core bolt 12. In some embodiments, the tubular portion 90 has internal threads 98 that are complementary to the threaded portion 44 of the core bolt 12. In some embodiments, the tubular portion 90 has a length 100 that is selected such that, when the fastener 10 is in a pre-installation position (see FIG. 1), the first end 92 abuts the thread run-out 46 of the core bolt 12 and the second end 94 abuts the step 82 of the sleeve 14. In some embodiments, the insert 16 is formed from a material that has lubricating properties. In some embodiments, the insert 16 includes copper. In other embodiments, the insert 16 may include other materials (e.g., other metals, plastics, etc.) that have frictional properties suitable to prevent thread galling and that are sufficiently malleable to aid in bulb formation, as will be described in further detail hereinafter.

In some embodiments, the core bolt 12 is composed of steel. In some embodiments, the core bolt 12 is composed of stainless steel. In some embodiments, the core bolt 12 is composed of 300 series stainless steel. In some embodiments, the core bolt 12 is composed of alloy steel. In some embodiments, the core bolt 12 is composed of a corrosion resistant material. In some embodiments, the core bolt 12 is composed of titanium alloy. In some embodiments, the core bolt 12 is composed of nickel alloy. In some embodiments, the sleeve 14 is composed of copper. In some embodiments, the sleeve 14 is composed of brass. In some embodiments, the sleeve 14 is composed of aluminum alloy. In some embodiments, the sleeve 14 is composed of 6066 aluminum alloy. In some embodiments, the sleeve 14 is composed of stainless steel. In some embodiments, the sleeve 14 is composed of 300 series stainless steel.

In some embodiments, the insert 16 is composed of metal. In some embodiments, the insert 16 is composed of copper. In some embodiments, the insert 16 is formed from a material that has lubricating properties. In some embodiments, the insert 16 includes other materials (e.g., other metals, plastics, etc.) that have frictional properties suitable to prevent thread galling and that are sufficiently malleable to aid in bulb formation.

Referring now to FIG. 1, in some embodiments, a pre-installation position of the fastener 10 is shown. In some embodiments, the internal threads 98 of the insert 16 receive and engage threadedly the threaded portion 44 of the core bolt 12 such that the first end 92 of the insert 16 abuts the thread run-out 46 of the core bolt 12. In some embodiments, the internal threads 84 of the sleeve 14 receive and engage threadedly the threaded portion 44 of the core bolt 12 such that the step 82 abuts the second end 94 of the insert 16, thereby trapping the insert 16 between the thread run-out 46 of the core bolt 12 and the step 82 of the of the sleeve 14. In some embodiments, the head 36 of the core bolt 12 is not seated within the pocket 68 of the sleeve 14, and is positioned such that it will seat within the pocket 68 of the sleeve 14 after some rotations (e.g., two to three rotations) of the core bolt 12 with respect to the sleeve 14.

Referring to FIGS. 1 through 4, in some embodiments, the workpiece 20 includes a surface modification 110 at a surface that is to be gripped by the fastener 10. In some embodiments, the surface modification 110 includes a rounding of the workpiece 20. That is, in some embodiments, prior to installation of the fastener 10, the workpiece 20 is prepared by rounding a corner to form the surface modification 110. In some embodiments, the surface modification 110 includes a radius 112. In some embodiments, the radius 112 is selected based on a diameter of the holes 22, 24. In some embodiments, the surface modification 110 results in an improved extrusion of the insert 16 during installation of the fastener 10. In some embodiments, the formation of the surface modification 110, which can be referred to as a convex portion, provides an improved fatigue resistance by reducing a sharp contact point between the workpiece 20 and the fastener 10. In some embodiments, a bulb 102 of the sleeve 14 contacts the surface modification 110. In some embodiments, the bulb 102 includes a radius that is sized and shaped to conform to the surface modification 110. In some embodiments, as the diameter of the holes 22, 24 increases above ⅜", an increase in the improvement of the fatigue resistance is also increased. In some embodiments, the extrusion of the insert 16 between the sleeve 14 and the core bolt 12 creates a compressive stress, which serves as a countermeasure to the initiation of a fatigue crack.

Referring now to FIG. 2, an intermediate position of the fastener 10 during installation is shown. During installation, a torque is applied to the fastener head 38 by an installation tool that is configured to grip the splines 40. In some embodiments, as the core bolt 12 rotates with respect to the sleeve 14, the insert 16 is compressed between the thread run-out 46 of the core bolt 12 and the step 82 of the sleeve 14. In some embodiments, in response to such compression, the insert 16 can only deform in an outward radial direction (i.e., away from the core bolt 12). In some embodiments, deformation of the insert 16 causes corresponding deformation of the sleeve 14 in an outward direction (i.e., away from the core bolt 12). In some embodiments, before the head 36 of the core bolt 12 is seated within the pocket 68 of the sleeve 14, no compressive force is exerted by the core bolt 12 on the sleeve 14. In some embodiments, with continued rotation of the core bolt 12 with respect to the sleeve 14, the head 36 of the core bolt 12 advances to a point such that it is seated within the pocket 68 of the sleeve 14.

Continuing to refer to FIG. 2, in some embodiments, once the head 36 of the core bolt 12 is seated within the pocket 68 of the sleeve 14, continued rotation of the core bolt 12 with respect to the sleeve 14 continues to compress the insert 16. In some embodiments, the insert 16 is constrained between the thread run-out 46 of the core bolt 12 and the step 82 of the sleeve 14, and as a result, it can only deform outwardly (i.e., away from the core bolt 12), and the sleeve 14 deforms correspondingly. In some embodiments, such deformation of the insert 16 and the sleeve 14 causes the formation of the bulb 102.

FIG. 3 illustrates the fastener 10 after the bulbing action of the insert 16 has been completed, in accordance with some embodiments. In some embodiments, a bulb 102 is formed by the insert 16 and the sleeve 14. In some embodiments, the bulb 102 has a diameter that is at least 1.4 times the outer diameter 70 of the tubular portion 60 of the sleeve 14. In some embodiments, the workpieces 18, 20 are secured between the bulb 102, on the blind side 26 of the workpiece 20, and the flanged head 66 of the sleeve 14, on the side of the workpiece 18 that is accessible by an installation tool. As shown in FIG. 3, in some embodiments, the fastener head 38 may be sheared off from the core bolt 12 to produce a fastener 10 that is substantially flush with a surface of the workpiece 18 when the fastener 10 is in its installed position.

Figure 4:
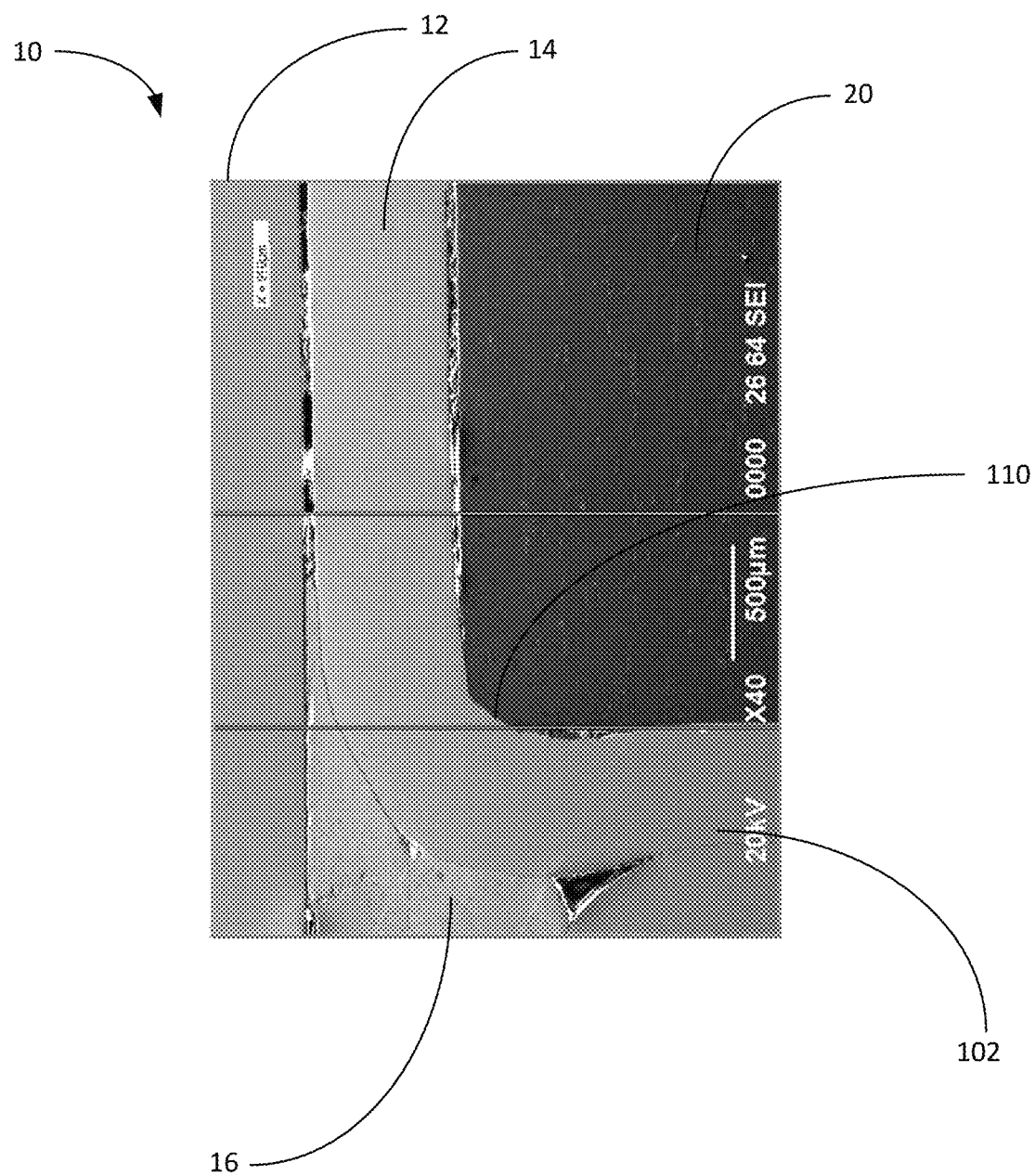
FIG. 4 is a photomicrograph of a portion of the fastener of FIG. 1 shown in the installed position of FIG. 3, according to some embodiments.

Referring to FIG. 1, in some embodiments, the fastener 10 is configured to form the bulb 102 as described above when installed in workpieces 18, 20 having a total combined thickness of between a minimum grip 106 and a maximum grip 108. Referring to FIG. 4, in some embodiments, the insert 16 is swaged outwardly to form the bulb 102.

Referring to FIGS. 5A through 5C, in some embodiments, a machining tool 150 includes a shaft 152 with a cutting tip 154 at one end thereof. In some embodiments, the cutting tip 154 is retractable into the shaft 152 through a first opening 156 in the shaft 152. In some embodiments, the first opening 156 enables the cutting tip 154 to retract into the shaft 152 so that the machining tool 150 can be inserted into and removed from the holes 22, 24. In some embodiments, the machining tool 150 is configured to prepare the workpiece 20 for the fastener 10. In some embodiments, the machining tool 150 is configured to prepare the surface modification 110 of the workpiece 20. In some embodiments, the machining tool 150 is a standalone tool. In some embodiments, the machining tool 150 can be combined with, for example, a drill bit or the like that forms the holes 22, 24 in the workpieces 18, 20. In such embodiments, the drill bit can be used to create the holes 22, 24 in the workpieces 18, 20, and after which, once inserted far enough, the cutting tip 154 can protrude from the shaft 152 and be rotated to remove a portion of material of the workpiece 20 to form the surface modification 110. In some embodiments, the surface modification 110 is convex. In some embodiments, the machining tool 150 can be a separate tool that is inserted after the drill bit is removed.

In some embodiments, the cutting tip 154 is composed of a hardened material. In some embodiments, the cutting tip 154 is composed of a material that is harder than the workpiece 20. In some embodiments, the cutting tip 154 is capable of cutting away part of the material of the workpiece 20. In some embodiments, the cutting tip 154 is composed of carbide. In some embodiments, the cutting tip 154 is coated with a diamond coating.

In some embodiments, the cutting tip 154 includes a first ramped portion 158, a second ramped portion 160, and a cutting portion 162. In some embodiments, the first ramped portion 158 extends obliquely relative to a longitudinal axis of the shaft 152. In some embodiments, the second ramped portion 160 extends obliquely relative to a longitudinal axis of the shaft 152. In some embodiments, the first ramped portion 158 extends in a first direction, while the second ramped portion 160 extends in a second direction. In some embodiments, the first ramped portion 158 and the second ramped portion 160 are configured to enable the cutting tip 154 to extend or retract from the shaft 152 based on contact with the workpiece 18 or the workpiece 20. In some embodiments, the cutting portion 162 is has a concave cutting surface. In some embodiments, the cutting portion 162 includes an inner radius. In some embodiments, when the cutting portion 162 contacts the workpiece 20, the shaft 152 is rotated to remove a portion of the workpiece 20. In some embodiments, the cutting portion 162 is sized and shaped to form a corresponding size and shape of the radius 112 of the surface modification 110.

In some embodiments, the shaft 152 includes a second opening 164. In some embodiments, the second opening 164 is located proximate to the first opening 156. In some embodiments, the second opening 164 is axially formed within the shaft 152. In some embodiments, the second opening 164 enables the cutting tip 154 to be removed from the machining tool 150. In some embodiments, the cutting tip 154 is replaceable.

In some embodiments, the shaft 152 includes a third opening 166 aligned with the first opening 156. In some embodiments, the third opening 166 is configured to enable the cutting tip 154 to retract into the shaft 152. In some embodiments, the shaft includes a spring member 168, one end of which is attached to a pin 170. In some embodiments, the pin 170 extends transversely to a longitudinal axis of the shaft 152. In some embodiments, the spring member 168 is rotatable about the pin 170 to enable the cutting tip 154 to move from a first retracted position, in which the cutting tip 154 is retracted within the shaft 152, to a second position, in which the cutting tip 154 extends outwardly from the first opening 156 of the shaft 152. In some embodiments, the cutting tip 154 is fixed on the shaft 152.

Referring to FIGS. 6A through 6F, in some embodiments, a process of preparing the workpiece 20 prior to installation of a fastener 10 includes preparation of the workpiece 20 with the machining tool 150. In some embodiments, the workpiece 20 is prepared using the machining tool 150 when not assembled with workpiece 18. In FIGS. 6A through 6F, the machining tool 150 is shown in sectional view.

Figure 6C:
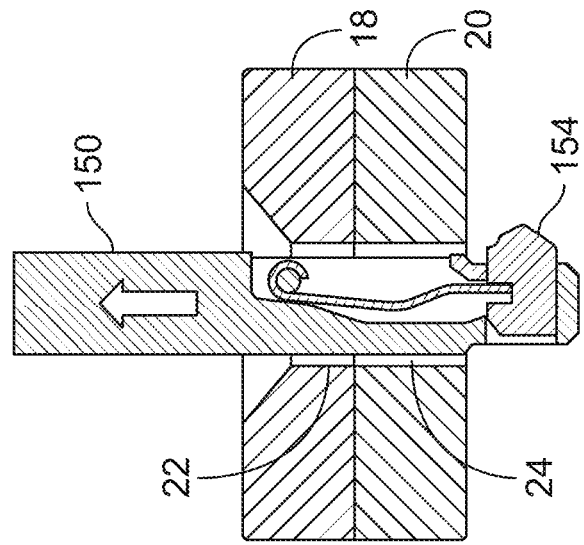
FIGS. 6A through 6F illustrate a process of preparing a workpiece prior to installation of the blind fastener shown in FIG. 1, according to some embodiments.
Figure 6B:
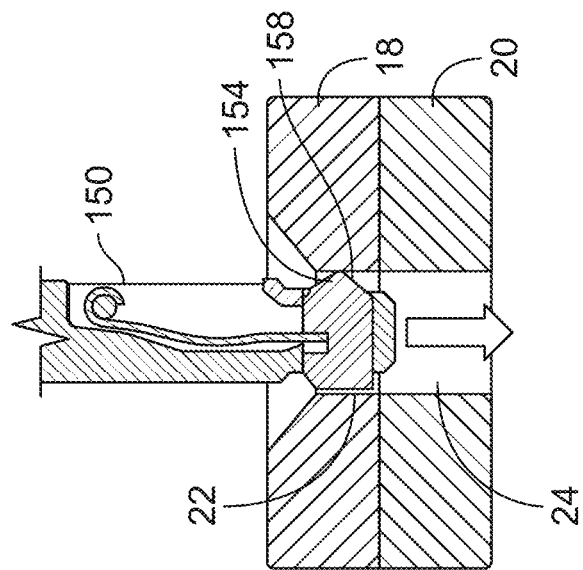
Figure 6A:
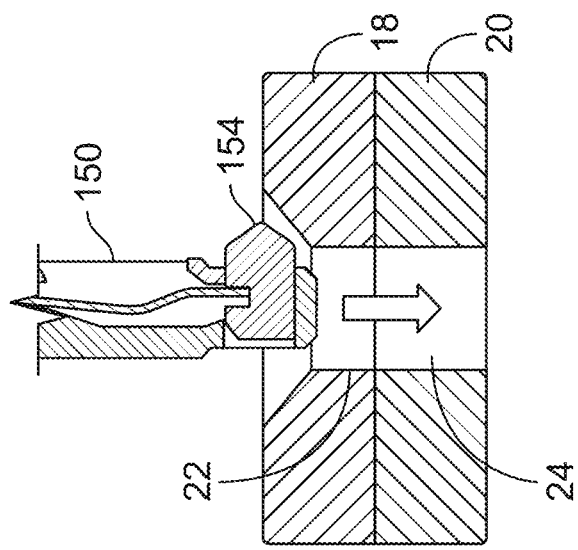
Figure 6D:
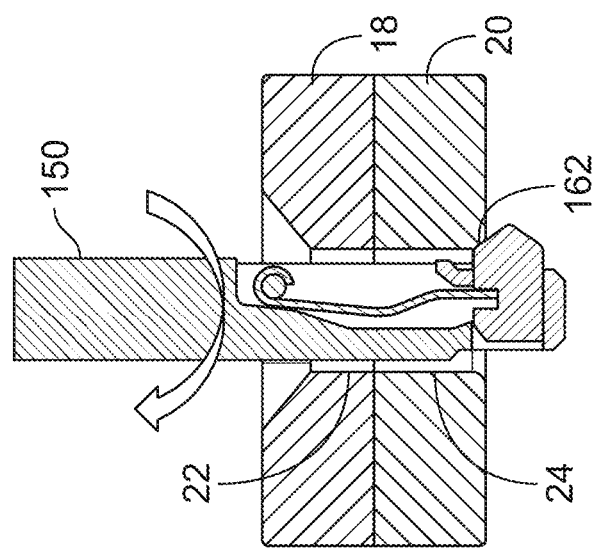
Figure 6E:
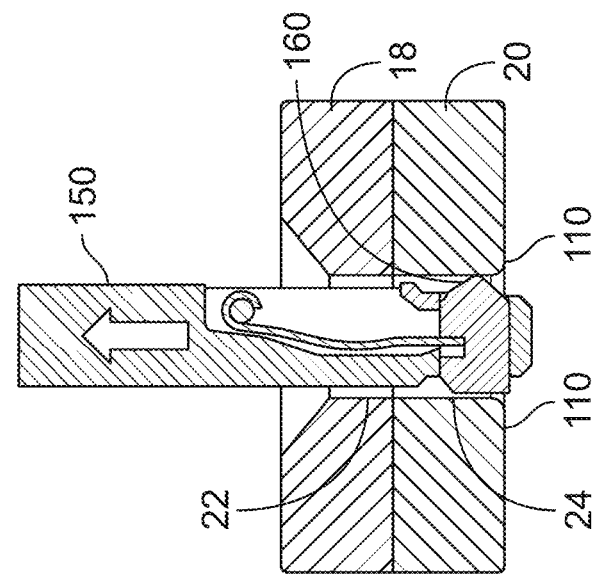
Figure 6F:
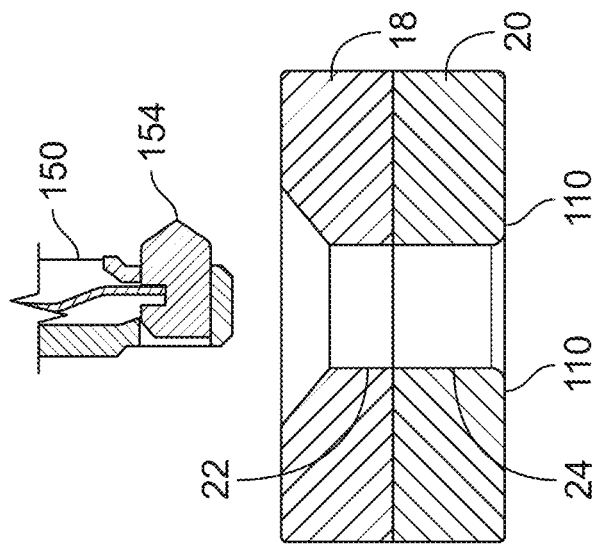

In some embodiments, prior to insertion of the machining tool 150 into the holes 22, 24 (see FIG. 6A), the cutting tip 154 extends from the shaft 152. In some embodiments, when the first ramped portion 158 contacts a wall of the holes 22, 24 (FIG. 6B), the contact forces the cutting tip 154 to be retracted into the shaft 152, enabling the machining tool 150 to be inserted into the holes 22, 24. In some embodiments, once the machining tool 150 is inserted through the holes 22, 24 (FIG. 6C), the cutting tip 154 protrudes from the shaft 152. In some embodiments, the machining tool 150 is retracted in the holes 22, 24 until the cutting portion 162 abuts an edge of the blind side surface of the workpiece 20 (FIG. 6D) and the holes 22, 24. In some embodiments, with the cutting portion 162 abutting the workpiece 20, the machining tool 150 is rotated, cutting away the surface of the workpiece 20 and forming the surface modification 110 in the workpiece 20 (FIG. 6D). In some embodiments, after the surface modification 110 is formed, the machining tool 150 is retracted from the holes 22, 24. In some embodiments, the second ramped portion 160 contacts the wall of the holes 22, 24 and forces the cutting tip 154 to be retracted into the shaft 152 (FIG. 6E). In some embodiments, the machining tool 150 is removed from the holes 22, 24 and the workpieces 18, 20 (FIG. 6F). In some embodiments, the workpieces 18, 20 are disassembled from one another, cleaned to eliminate any loose material from the cutting process, and reassembled with one another. In some embodiments, the workpieces 18, 20 remain assembled during the cutting and cleaning processes.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method, comprising: inserting a machining tool through a hole of at least one workpiece, wherein the at least one workpiece includes a first surface and a second surface opposite the first surface, wherein the hole extends from the first surface to the second surface, wherein the hole forms an inner wall, wherein the machining tool includes: a shaft having a longitudinal axis and a first opening, and a cutting tip located proximate to one end of the shaft, wherein the cutting tip includes a first side and a second side opposite the first side, and a width extending from the first side to the second side, a first edge, a second edge opposite the first edge, a cutting portion, wherein the cutting portion includes a concave cutting surface extending towards the second edge from the first edge to a first location between the first edge and the second edge, wherein the concave cutting surface extends across an entirety of the width of the cutting tip, wherein the concave cutting surface includes an inner radius, wherein the first location extends linearly from the first side to the second side, wherein the concave cutting surface includes an inner radius that curves inwardly relative to the longitudinal axis, a first ramped portion, wherein the first ramped portion extends obliquely in a first direction relative to the longitudinal axis, wherein the first ramped portion extends from the second edge to a second location between the first edge and the second edge, and a second ramped portion, wherein the second ramped portion extends obliquely relative in a second direction relative to the longitudinal axis, wherein the second direction is different than the first direction, wherein the second ramped portion extends from the first location to the second location, wherein the cutting tip is configured to be retractable into the shaft of the machining tool in a retracted position at the first opening and configured to be extendable from the shaft in an extended position at the first opening, wherein during the inserting, the first ramped portion contacts the inner wall, thereby moving the cutting tip to the retracted position without cutting the first surface, positioning the cutting portion of the cutting tip to abut an edge of the at least one workpiece, wherein the edge of the at least one workpiece is located at a junction of the second surface and the inner wall; forming a surface modification at the edge with the cutting tip, wherein the surface modification has an outer radius corresponding to the inner radius of the concave cutting surface; removing the machining tool from the hole, wherein during the removing, the second ramped portion contacts the surface modification without cutting the surface modification; and installing a fastener within the hole, wherein the fastener engages the surface modification.

2. The method of claim 1, wherein the at least one workpiece includes a plurality of workpieces, wherein the plurality of workpieces is configured to be joined to one another, and wherein holes in the plurality of workpieces are substantially aligned with one another.

3. The method of claim 1, further comprising forming the hole with the machining tool.

4. The method of claim 1, wherein the forming the surface modification includes rotating the machining tool.

5. The method of claim 1, wherein the cutting tip does not rotate relative to the shaft of the machining tool.

6. The method of claim 1, wherein the cutting tip comprises a single cutting edge.

7. The method of claim 1, wherein the cutting tip is biased toward the extended position.

8. The method of claim 1, wherein at least one of the first ramped portion and the second ramped portion comprises a flat surface.

9. The method of claim 1, wherein the cutting tip is configured to be removed from the machining tool.

10. The method of claim 1, wherein the machining tool further comprises a flat spring, wherein the flat spring is configured to bias the cutting tip to the extended position.

11. The method of claim 10, wherein the flat spring comprises a first end, wherein the cutting tip comprises an opening, wherein the first end of the flat spring is located within the opening of the cutting tip.

12. The method of claim 3, wherein the forming the hole includes drilling.

13. The method of claim 3, wherein the forming the hole and the inserting the machining tool into the hole are performed concurrently.

14. The method of claim 1, wherein the inserting comprises inserting the machining tool from a location adjacent the first surface.

15. The method of claim 14, wherein the installing comprises forming a deformed portion in an end of the fastener, wherein the deformed portion of the fastener engages the surface modification.

16. The method of claim 14, wherein the installing comprises forming a bulb in an end of the fastener, wherein the bulb of the fastener engages the surface modification.

17. The method of claim 14, wherein the fastener comprises a bolt and a sleeve, wherein the bolt is disposed within the sleeve, and wherein the installing comprises rotating the bolt relative to the sleeve, thereby to deform an end of the sleeve to form a deformed end, wherein the deformed end engages the surface modification.

* * * * *